PRECISION SELECTOR DEVICE

Filed Jan. 29, 1948 4 Sheets-Sheet 1

INVENTOR.
JENS MORTON
BY Paul A. Talbot.
ATTORNEY

Aug. 21, 1951 J. MORTON 2,565,083

PRECISION SELECTOR DEVICE

Filed Jan. 29, 1948 4 Sheets-Sheet 2

INVENTOR.
JENS MORTON
BY Paul A. Talbot.
ATTORNEY

Aug. 21, 1951 J. MORTON 2,565,083

PRECISION SELECTOR DEVICE

Filed Jan. 29, 1948 4 Sheets-Sheet 3

INVENTOR.
JENS MORTON
BY Paul A. Talbot.
ATTORNEY

INVENTOR.
JENS MORTON
BY Paul A. Talbot.
ATTORNEY.

Patented Aug. 21, 1951 2,565,083

UNITED STATES PATENT OFFICE 2,565,083

PRECISION SELECTOR DEVICE

Jens Morton, Philadelphia, Pa., assignor to Morton Engineering Company, a partnership Application January 29, 1948, Serial No. 5,061

7 Claims. (Cl. 161—1)

My invention relates to a device for time determined operations in which the precise time for the operation or operations may be selected at any predetermined time, night or day, and continued also for any predetermined period.

Among the purposes and objects is to provide a device which may be set to set any operation into force or being at the precise predetermined time and to discontinue the operation at the precise time desired or to likewise effect a plurality of different operations at precise times and for precise intervals.

Another object is to provide a signal showing that the operation is in force or being or to signal that no operation is in progress.

An object is to provide an electric contact means which makes an instant contact and to prevent electric arcs from effecting the contact points.

Another object is to provide for a 24 hour sequence of operations so that contacts may be made night or day without requiring the device to be reset for day or night operation.

An object is to provide a selector which shows at a glance the time and period of each of a plurality of operations for which the device is set.

An object is to provide for an instantaneous movement of the selector member independent of its movement by a time operated driving means.

Still another object is to provide a dual movement of the selector member, one movement by a time operated driving means and another by a pawl and spring to provide precise instantaneous movement, both movements combining to intermittently advance the selector member a part of its complete revolution, which may be one a day.

I accomplish these and other objects by the construction herein described and shown in the accompanying drawings which form a part of this my disclosure.

In the drawings.

Similar reference characters refer to similar parts throughout the several views of the drawings and in the specifications.

Figure 1:
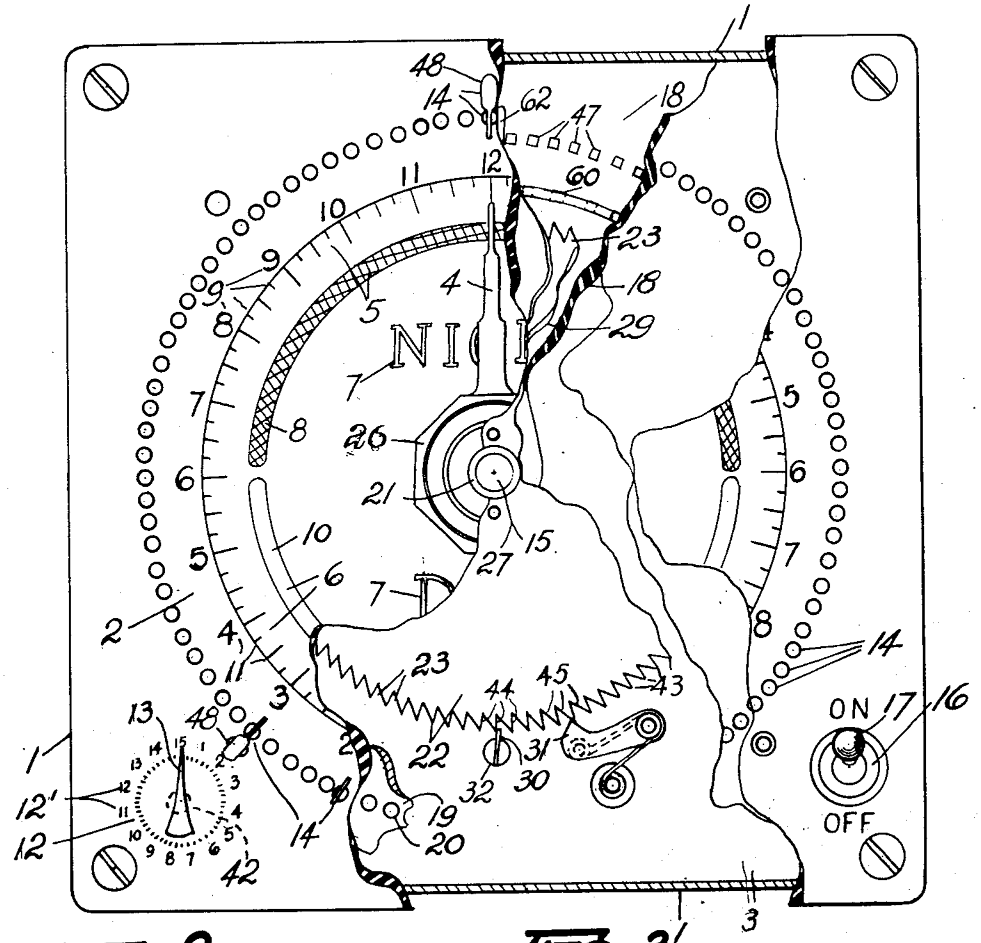
Fig. 1 is a front elevational view with parts broken away to show the interior.

I am aware that time control clocks, alarm clocks and devices for timing ovens and regulating furnace dampers are now well known. Such devices are usually inaccurate and limited to a single operation during a twelve hour period. Some have brushes and sweeping contacts for controlling electric circuits which become pitted by the arc which occurs in making or opening the circuit.

My invention overcomes the difficulties above mentioned and others by making instant contact through breaker contact points and by an intermittent actuator or selector member which may be better understood by the detailed description of a preferred embodiment which follows.

Operations, signals, and a plurality of precise time interval controls which are set to occur during the 24 hours of night and day are made possible and practical by my invention.

The timing of radio programs may be made automatically by setting my device. A single circuit may be made and continued for a fixed period of time or many separate circuits may be timed to be made and continued for a period in sequence or at irregular intervals during any part of the night or day.

In the specifications I have not attempted to show all of the many modifications which are possible without departing from the principles which underlie my invention but rather to show and describe in precise detail a preferred embodiment so that the construction may more readily be understood by one skilled in the art to which my invention pertains. After a study of this disclosure, modifications may suggest themselves to adapt my device to the many uses for which it may be adapted.

The preciseness of the detailed description and the preciseness of the drawings are not intended to limit the scope of my invention which is set forth in the claims.

Referring to the drawings I have shown my selector device as having a rectangular housing 1 with a face or dial 2 and back panel 3 which inclose the mechanism for driving the hand 4 and other parts.

The dial is preferably divided into two parts, one for night 5 and the other for day 6. Each part of the dial is divided into twelve major periods from six in the evening to six in the morning and the other part is divided into twelve major periods corresponding to the daylight hours from six in the morning to six in the evening. The two parts thus represent the twenty-four hours of night and day.

Indicia 7 on the dial designate which part, night or day time, is in effect and a black semicircle 8 is disposed adjacent the night time hours or calibrations 9 and a white semicircle 10 is disposed adjacent the day time calibrations 11.

The calibrations between the hourly periods may be marked to designate the interim time periods between the hourly periods; fifteen minute intervals are shown in the drawings but such interval markings may be most any division of time best suited to the purpose for which my device is used.

In addition to the major parts of the time designations for night and day, a fractional or minute dial 12 is provided on the face, divided or calibrated into minutes or fractions thereof, to conform to the time period designations in between each hour on the major parts of the dial such as for each fifteen minute period.

A hand 13, is provided for the fractional dial 12, so that one complete revolution of the hand is made for each fifteen minute period. The indicia 12′ on the dial 12 is provided with one principal division marked to correspond to each minute of the fifteen minutes; minor calibrations or indicia on the dial may be for fifteen seconds or other periods representing the fraction of the minute intervals.

On the main dial, adjacent each 15 minute period and disposed in a circle on the twenty-four hour dial, I have provided the selector stops 14 so that any one or all of the ninety-six stops may be moved to select any period or periods of operation as may be desired. The construction and operation of the stops will be described hereinafter in detail.

The face of my device is provided, at the center on which the hand 4 rotates, with a signal 15 which indicates that the operation is in progress or the precise time it begins or is stopped. The main electrical switch 16 for making or breaking the electric circuit to my device is also provided with an operator 17 on the face of my device.

Within the housing and behind the face, which is preferably constructed of electrical non-conducting material, I have provided the non-conducting contact panel 18. Between the face and the panel 18 I have provided the front bearing plate 19 which is apertured to receive and guide the plungers 20 of the stops 14.

Behind the contact panel 18 and secured to the center sleeve or hollow shaft 21 to which the hand 4 is secured I have provided the selector member 22, the periphery of which is provided with ninety-six notches 23 or like structure for intermittent drive which accurately conform to the like number of fifteen minute designations on the dial as well as to the stops.

The center sleeve or hollow shaft 21 is secured to an electrically insulated hub 24 which is secured to said selector member 22 at one end and to the non-conducting contact arm 25 at its opposite end. The hand 4 is secured to the hollow shaft by the adjusting knob 26 which is preferably of non-conducting material and secured to the outer end of the shaft. Within the hollow center of the shaft 21 I have provided a transparent light conducting member 27 which extends to the outer end of the knob and shaft to pipe light from to the signal 15 the electric bulb 28 disposed at the opposite end of the shaft and light member 27 within the housing and behind the rear bearing plate 29 which coacts with the bearing plate 19 to rotatably mount the hollow shaft and parts secured to it all of which are driven and/or moved intermittently by the escapement 30 and precision pawl 31, both of which move the selector member; the pawl holding it intermittently during a part of each fifteen minute period while the escapement completes its single revolution in the fifteen minute period.

Figure 12:
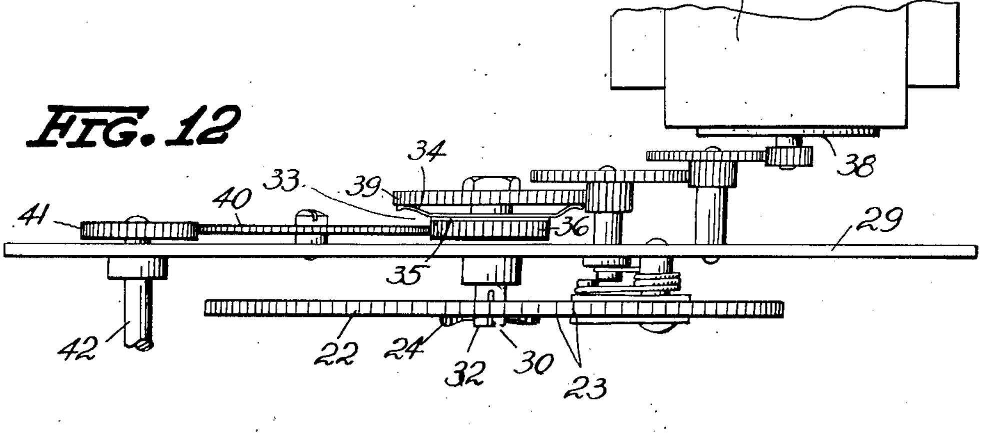
Fig. 12 is a plan view of the gear train and connected parts.
Figure 13:
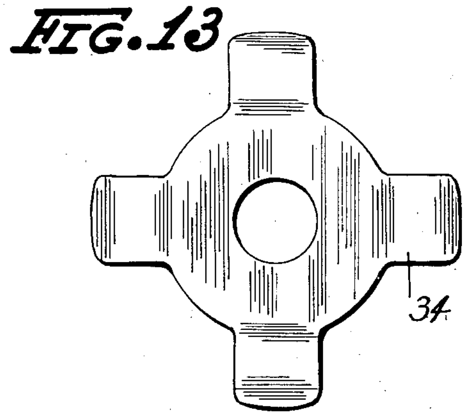
Fig. 13 is an elevational view of the friction spring.
Figure 14:
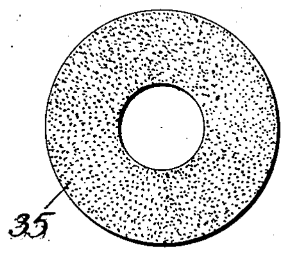
Fig. 14 is an elevational view of the friction disc.

Figs. 1, 2, 3 and 4 of the drawings show some of the critical positions of the escapement and the pawl. The escapement 30 mounted on and rotated by the shaft 32, which makes one complete revolution each fifteen minutes, drives or moves the selector member 22. A friction 33 comprising a spring member 34, shown in Fig. 13, and disc 35, shown in Figs. 12 and 14 are also mounted on the shaft 32 to provide an adjustment and independent movement between the gear 36 secured to the shaft 32. The gear 36 is driven through the train of gears 37 by the synchronous motor 38. The friction 33 and the gear 39 are mounted on but not secured to the shaft 32. The gear 36 is positioned to mesh with the intermediate gear 40 which also meshes with the gear 41 secured to the shaft 42 on which the hand 13, of the minute dial 12 is secured. The hand 13, when turned to any of the time divisions on the dial 12 causes the friction to slip so that the precise moment at which the shaft 32 starts to make its revolution is thus determined; for instance if the hand 13 is set to 2 minutes and 10 seconds on the dial 12 the shaft 32 and escapement are advanced 2 minutes and 10 seconds with respect to the drive by the synchronous motor so that the fifteen minute period is divided into smaller subdivisions than indicated by the main hand 4 and the stops 14 likewise are made to function 2 minutes and 10 seconds later than when the hand 13 is set at 15 on the dial 12.

Figures 15, 16:
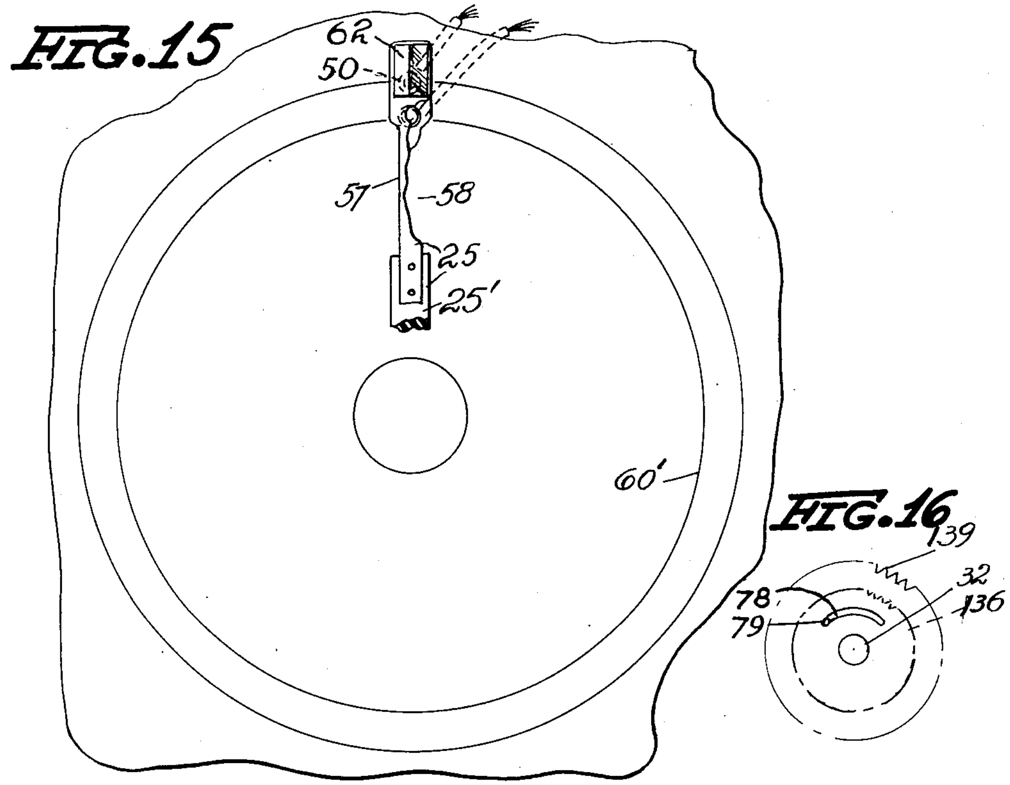
Fig. 15 is an elevational view showing a modification of the contact rings and the yielding contact.
Fig. 16 is an elevational detail of a modification of the selector.

In Fig. 15 I have shown a modification which also permits the selector member to be moved independently of the escapement 30 as will be hereinafter more fully described.

Figure 2:
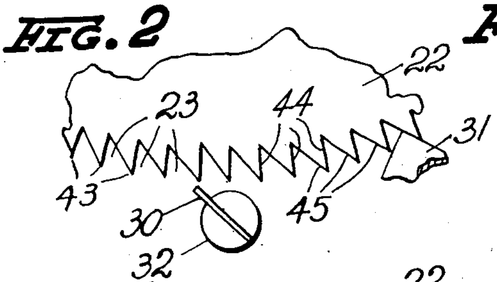
Figs. 2, 3 and 4 are fragmentary details of the time interval selector mechanism.
Figure 3:
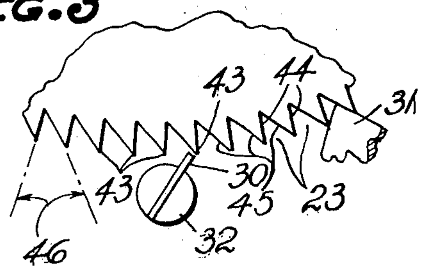
Figure 4:
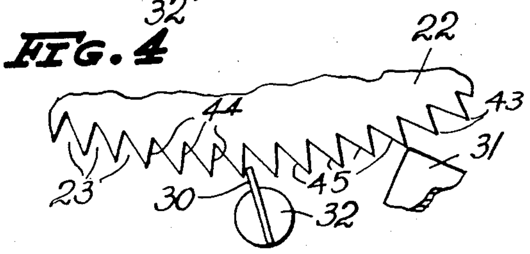

In Figs. 1 and 4 the escapement 30 is shown engaged to one of the sides of the ninety six notches 23 of the selector member 22 thereby advancing or rotating the member. At the precise position shown in Fig. 4 the pawl 31 is about to force the member 22 ahead by the pawl spring 31 forcing the pawl into the notch, such as shown in Figs. 2 and 3. In Fig. 2 the escapement 30 is shown as beyond that part of its revolution where the member is moved by the escapement. In Fig. 3 the escapement is shown as entering between the points 43 at each side of each notch.

The notches are each preferably so shaped that the side 44 is disposed substantially on a radial line from the center of the member, to cooperate with the escapement, as it becomes engaged with the side 44, to move the member. The other side 45 of each notch is preferably inclined at an angle 46 to a radial line from the center of the member thus to permit the escapement to force the pawl to rise out of the notch until it reaches the next point 43 whereupon it suddenly enters the next notch forcing the member to advance independently of the movement imparted by the escapement. The movement of the member by the pawl completes the intermittent movements started by the escapement and is instantaneous.

The contacts 47 are so positioned in relation to the notches and pawl as to make contact at the precise moment the pawl drops into any one of the notches depending on any stop which is set to permit the contact to be made.

Each stop 14 preferably comprises the handle 48 which is tiltable substantially ninety degrees from its normal upright position on the pivot pin 49, in the plunger 20, to its position, when set to operate the contact 50 on the contact arm 25. The plunger 20 is preferably provided with a notch 51 which receives the tongue 52 of the handle 48. The end 53 of the tongue is substantially greater in length as related to the pivot pin 49 than the side 54, thus when the handle is upright the plunger is withdrawn so that the end 55 is out of the path of travel of the contact arm. When tilted so that the side rests on the cross piece 56 the plunger extends inward to engage the contact arm to force its contact 50 to engage one of the ninety six stationary contacts on the contact panel 18.

Figures 5, 6, 7:
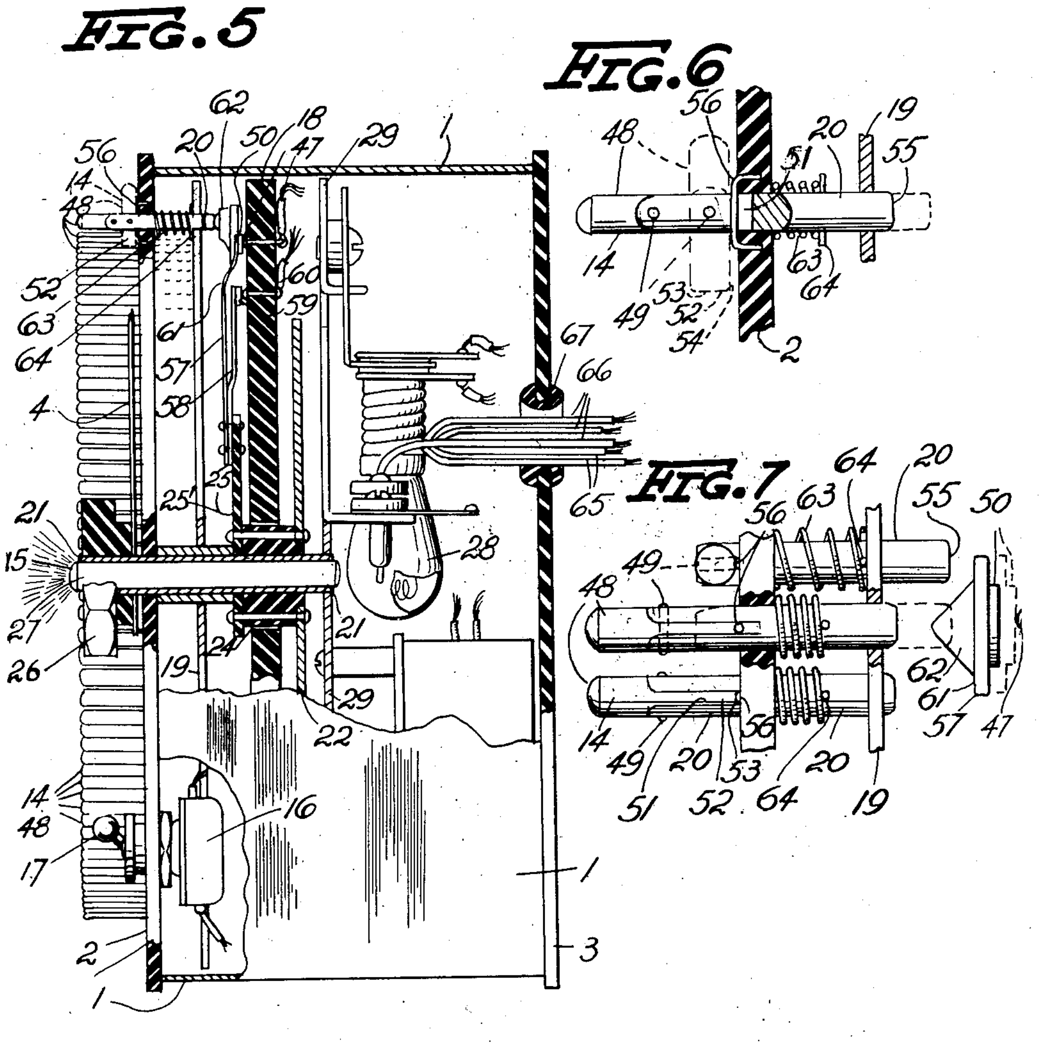
Fig. 5 is a part section and side elevation of my device.
Fig. 6 is a fragmentary detail of a typical period selector.
Fig. 7 is a fragmentary detail of several period selectors.
Figures 8, 9, 10:
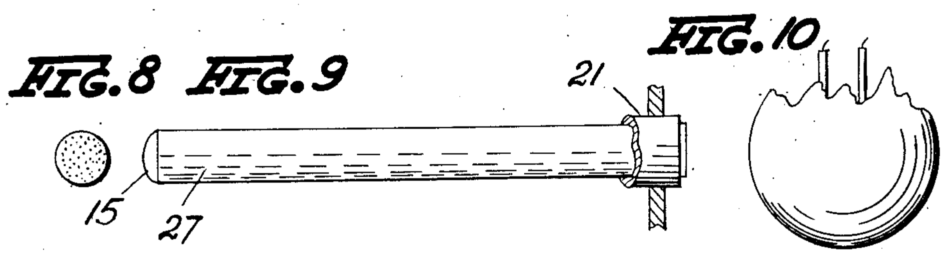
Fig. 8 is an end elevation of the light signal rod.
Fig. 9 is a side elevation of the light signal rod.
Fig. 10 is a fragmentary detail of the signal light.
Figure 11:
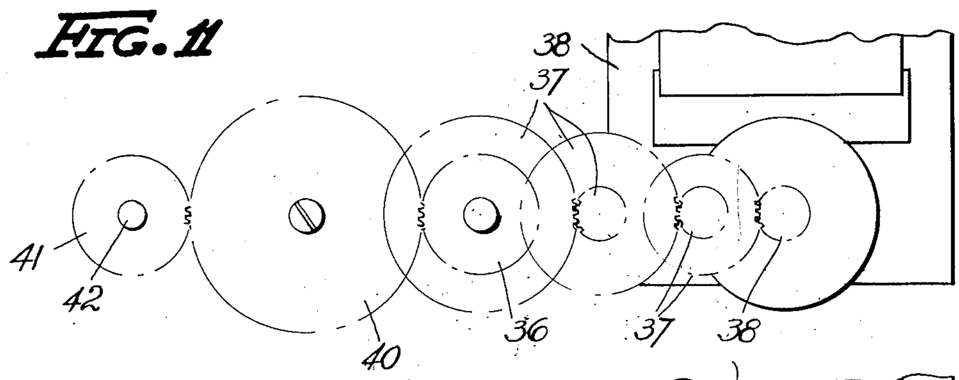
Fig. 11 is a diagrammatic view of the gear train.

The contact arm 25 is rotated with the member 22, hand 4 and hollow shaft 21 and is preferably insulated from the other parts by the nonconductive shank 25′ to which the conducting springs 57 and 58 are secured. The contact 50 is secured to the end of the spring 57 and the contact 59 to the spring 58. The contact 59 slides in its circular path of travel in contact with the ring of contacts 60. The face 61 of the spring 57 is provided with the ridge boss 62 which engages the end 55 of one of the plungers, when set, to force the contact 50 into contact with the particular contact, or contacts 47. The positions of the plungers may be seen by referring to the details shown in Figs. 6 and 7 as well as in the section, Fig. 5, the set position of the plunger is shown in broken lines.

A compression spring 63 engages the spring seat 64 on each plunger to force the plunger to the set position when the handle is tilted. The bearing or cross piece 56 is provided for each of the tongues 52 to slide on when the handles are moved. The cross pieces pass through the notches 51 preventing the plungers and handles from turning in the apertures which guide the plungers.

Referring particularly to Fig. 15 of the drawings I have shown a continuous contact ring 60 which provides a complete circuit as soon as the contact 50 is forced to engage any of the contacts 47 as hereinbefore described.

The signal light, contacts, motor and switch and electrical connections are supplied with electric current from the source by the wires 65 and a plug in cord (not shown) in the usual manner and the wires 66, which connect to the operations for which my device makes or breaks the circuit or circuits, pass through the back panel outlet 67 and be carried to the operations or loads by means of an electric cable (not shown).

Figure 17:
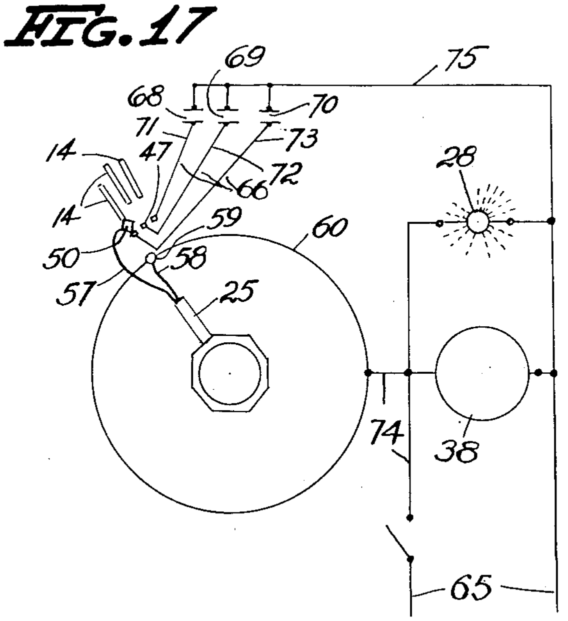
Fig. 17 is a wiring diagram of a few of the contact and period selectors.

The numerous electric connections to the various parts within the housing are broken off to avoid confusion. The principal wires are shown, in part, in the wiring diagram, Fig. 17.

Several separate loads such as 68, 69 and 70 are shown connected to three of the plurality of contacts 47 by the wires 71, 72 and 73. One of the selectors 14 is shown set by forcing the contact 50 to connect the wire 73 to its respective operation or load 70. The contact 59 is connected to the source 74 through the ring of contacts 60, the contact 50 through the springs 57 and 58 to complete the circuit; the common 75 connecting the various loads to the source and also connecting the signal light 28 to show that an operation is in progress or the precise time it is started or stopped. The number of operations or loads may be as numerous as the ring of contacts 47 or one every 15 minutes or fraction throughout the twenty four hours of day and night.

Figure 18:
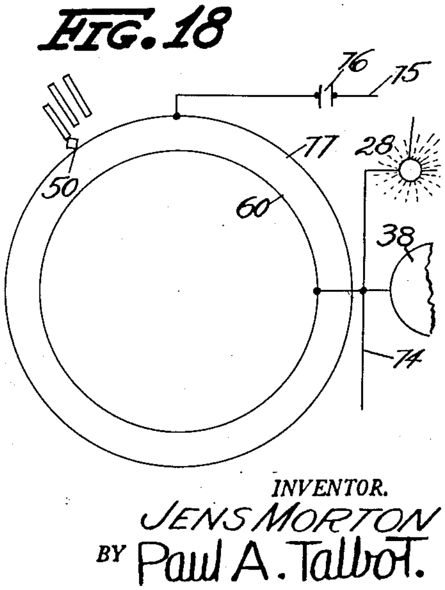
Fig. 18 is a wiring diagram showing the modification as shown in Fig. 15.

In Fig. 18 I have shown a modification in which a single load 76 is connected by a ring 77 which, when contacted with the contact 50, completes the circuit. The circuit may be made and continued over any period the selector stops are set for.

In Fig. 16 of the drawings I have shown a modification which may be substituted for the friction 33 when no minute adjustment, such as shown on the dial 12, is required. The gears 40 and 41 and the shaft 42 and such other parts which are used with the minute selector are also not used with the modified action caused by the escapement 30 and pawl 31, heretofore described. It is pointed out that a part only of the travel of the member 22 is imparted by either the escapement or the pawl and that a sudden forward motion is caused by the pawl which carries the side 44 of the particular notch 23 away from and out of contact with the pawl when the pawl enters any particular notch. The friction slips when the hand 4 is set and without the use of the friction the escapement 30 is also required to disengage the sides of the notches. A segmental slot 78 is provided in the gear 136 which is substituted for the gear 36 and secured to the shaft 32. A pin 79 is secured to the gear 139, which is driven by the motor through the train of gears and engages one of the ends of the slot to drive the gear 136 thus permitting the escapement to be moved out of its respective notch when the hand and selector member 22 are turned as in setting my device to the correct time of day or night as in starting.

The size, material and parts which are now commonly used such as motors, switches, etc., may be modified to suit my device to the many services for which it may be adapted.

Having thus described a preferred embodiment of my invention what I claim as new and desire to secure by Letters Patent is set forth in the following claims.

I claim:

1. In timing devices having a dial, housing and a shaft or the like rotatable once during a precise time period and means for rotating said shaft, a selector member having notches and means on said shaft to cooperate with said notches to advance said selector member a part of the width of one notch, said member movable substantially one notch for each revolution of said shaft and a second means independent of said means on said shaft for engaging the sides of one of said notches to move said selector member the remainder of the width of one of said notches, an arm secured to and rotated by said selector member, spring contacts carried by said arm for completing an electric circuit, a ridge boss on one of said spring contacts and a plurality of selector stops annexably disposed and movable into the path of travel of said ridge boss to cooperate with said means engaging the side of the notches on said selector member to instantly make contact to complete said electric circuit.

2. In timing devices having a dial, housing and a shaft or the like rotatable once during a precise time period and means for rotating said shaft, a selector member having notches and means on said shaft to cooperate with said notches to advance said selector member a part of the width of one notch, said member movable substantially one notch for each revolution of said shaft and a second means independent of said means on said shaft for engaging the sides of one of said notches to move said selector member the remainder of the width of one of said notches, an arm secured to and rotated by said selector member, spring contacts carried by said arm for completing an electric circuit, a ridge boss on one of said spring contacts and a plurality of selector stops annexably disposed and movable into the path of travel of said ridge boss to cooperate with said means engaging the side of the notches on said selector member to instantly make contact to complete said electric circuit, said second means moving said selector member instantly.

3. In timing devices having a dial, housing and a shaft or the like rotatable once during a precise time period and means for rotating said shaft, a selector member having notches and means on said shaft to cooperate with said notches to advance said selector member a part of the width of one notch, said member movable substantially one notch for each revolution of said shaft and a second means independent of said means on said shaft for engaging the sides of one of said notches to move said selector member the remainder of the width of one of said notches, an arm secured to and rotated by said selector member, spring contacts carried by said arm for completing an electric circuit, a ridge boss on one of said spring contacts and a plurality of selector stops annularly disposed and movable into the path of travel of said ridge boss to cooperate with said means engaging the side of the notches on said selector member to instantly make contact to complete said electric circuit and means for setting the precise time for the instantaneous movement of said second means.

4. In timing devices having a dial, housing and a shaft or the like rotatable once during a precise time period and means for rotating said shaft, a selector member having notches and means on said shaft to cooperate with said notches to advance said selector member a part of the width of one notch, said member movable substantially one notch for each revolution of said shaft and a second means independent of said means on said shaft for engaging the sides of one of said notches to move said selector member the remainder of the width of one of said notches, an arm secured to and rotated by said selector member, spring contacts carried by said arm for completing an electric circuit, a ridge boss on one of said spring contacts and a plurality of selector stops annexably disposed and movable into the path of travel of said ridge boss to cooperate with said means engaging the side of the notches on said selector member to instantly make contact to complete said electric circuit and a tiltable handle for said selector stops disposed at time designations on said dial to cooperate with said selector member to start and to stop an operation at the time indicated on the dial.

5. In timing devices having a dial, housing and a shaft or the like rotatable once during a precise time period and means for rotating said shaft, a selector member having notches and means on said shaft to cooperate with said notches to advance said selector member a part of the width of one notch, said member movable substantially one notch for each revolution of said shaft and a second means independent of said means on said shaft for engaging the sides of one of said notches to move said selector member the remainder of the width of one of said notches, an arm secured to and rotated by said selector member, spring contacts carried by said arm for completing an electric circuit, a ridge boss on one of said spring contacts and a plurality of selector stops annexably disposed and movable into the path of travel of said ridge boss to cooperate with said means engaging the side of the notches on said selector member to instantly make contact to complete said electric circuit and a tiltable handle for said selector stops disposed at time designations on said dial to cooperate with said selector member to start and to stop an operation at the time indicated on the dial and a second dial and means for controlling the precise moment for starting and stopping the operation at a predetermined fraction of the period designated by said selector stops.

6. In a time interval device for starting and stopping operations, said device having a shaft and means for rotating said shaft one revolution during a precise period of time, a notched selector member rotatable intermittently once each twenty four hours or other time period by said shaft and also by means instantaneously engaging the two sides of each of the notches whereby said member is advanced a part of the width of a notch by said shaft and the remaining part by said instantaneous means in succession, notch by notch, to rotate said member, an arm and hand indicating means and a dial indicating the time such as the time of day or night by said hand, a plurality of selector stops arranged at time intervals shown on said dial and movable to be set to cooperate with said arm to start and to stop a respective operation and to start and to stop a plurality of operations during each revolution of said member, said arm and hand being secured to and rotated with said member and means independent of said means for rotating said shaft to advance or retard the movement thereof with respect to said rotating means to change the precise instant said instantaneous means engages the sides of a notch and a second dial for indicating the precise time in cooperation with said first dial.

7. In a time operated interval selector device, a selector member rotatable intermittently during a period of time, a shaft and means thereon to move said member a part of the intermittent period of motion of said member and a precision pawl and means on said member cooperating with said pawl to move said member instantaneously the remaining part of the intermittent movement of said member and spring means urging said pawl to move said member, said shaft means overcoming said spring means to move said member to the next successive intermittent period of movement and means secured to and moved by said member to start or to stop an operation within a precise period of movement or a plurality of intermittent movements of said member, said member being rotatable on a hollow shaft and transparent means therein for transmitting light from within the device to its exterior face to signal the precise instant an operation begins and during its progress and the precise instant the operation stops.

JENS MORTON.

REFERENCES CITED

The following references are of record in the file of this patent:

UNITED STATES PATENTS

| Number | Name | Date |
|---|---|---|
| 2,106,714 | Brugger | Feb. 1, 1938 |
| 2,195,642 | De Larm | Apr. 2, 1940 |
| 2,400,085 | Gent | May 14, 1946 |